US011898466B2

(12) United States Patent
Iglesias Cano et al.

(10) Patent No.: US 11,898,466 B2
(45) Date of Patent: Feb. 13, 2024

(54) METHOD FOR COATING A TURBOMACHINE GUIDE VANE, ASSOCIATED GUIDE VANE

(71) Applicant: SAFRAN AIRCRAFT ENGINES, Paris (FR)

(72) Inventors: Célia Iglesias Cano, Moissy Cramayel (FR); Vincent Marie Jacques Rémi De Carné-Carnavalet, Moissy Cramayel (FR); Antoine Hubert Marie Jean Masson, Moissy Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 64 days.

(21) Appl. No.: 17/619,505

(22) PCT Filed: Jun. 18, 2020

(86) PCT No.: PCT/FR2020/051055
§ 371 (c)(1),
(2) Date: Dec. 15, 2021

(87) PCT Pub. No.: WO2020/254764
PCT Pub. Date: Dec. 24, 2020

(65) Prior Publication Data
US 2022/0235666 A1 Jul. 28, 2022

(30) Foreign Application Priority Data
Jun. 20, 2019 (FR) ...................................... 1906647

(51) Int. Cl.
*F01D 9/04* (2006.01)
*F01D 5/28* (2006.01)

(52) U.S. Cl.
CPC ............. *F01D 9/041* (2013.01); *F01D 5/282* (2013.01); *F01D 5/288* (2013.01);
(Continued)

(58) Field of Classification Search
CPC .......... F01D 9/041; F01D 5/282; F01D 5/288; F05D 2230/31; F05D 2230/90; F05D 2240/121; F05D 2240/122; F05D 2250/11
See application file for complete search history.

(56) References Cited

U.S. PATENT DOCUMENTS 3,762,835 A * 10/1973 Carlson .................. F01D 5/147 29/889.71
4,594,761 A * 6/1986 Murphy .................. F01D 5/282 29/418
(Continued)

FOREIGN PATENT DOCUMENTS

EP 3 214 267 A1 9/2017
FR 3 041 375 A1 3/2017

OTHER PUBLICATIONS

International Search Report as issued in International Patent Application No. PCT/FR2020/051055, dated Nov. 20, 2020.

*Primary Examiner* — Brian Christopher Delrue
(74) *Attorney, Agent, or Firm* — Pillsbury Winthrop Shaw Pittman LLP

(57) ABSTRACT

A method for coating a turbomachine guide vane including a root and a tip, an extrados face and an intrados face connected to one another by a leading edge and a trailing edge, the method including completely covering one of the faces of the vane with a polymer coating of thickness ($e_1$) provided with grooves, removing the grooves from a part of the polymer coating in such a way that the polymer coating includes a grooved zone and a non-grooved zone, coating the non-grooved zone with a coat of paint of thickness ($e_3$) such that the thickness of the coat of paint superimposed on the non-grooved zone is substantially equal to the thickness ($e_1$) of the grooved zone.

11 Claims, 5 Drawing Sheets

(52) U.S. Cl.
CPC ...... *F05D 2230/31* (2013.01); *F05D 2230/90* (2013.01); *F05D 2240/121* (2013.01); *F05D 2240/122* (2013.01)

(56) References Cited

U.S. PATENT DOCUMENTS

| | | | | |
|---|---|---|---|---|
| 5,337,568 | A | 8/1994 | Lee et al. | |
| 6,341,747 | B1 * | 1/2002 | Schmidt | B64C 11/205 416/224 |
| 9,422,821 | B2 * | 8/2016 | Hyatt | F01D 5/288 |
| 2011/0129351 | A1 * | 6/2011 | Das | C23C 24/04 416/241 A |
| 2013/0146217 | A1 * | 6/2013 | Kray | F15D 1/003 156/210 |

* cited by examiner

METHOD FOR COATING A TURBOMACHINE GUIDE VANE, ASSOCIATED GUIDE VANE

CROSS-REFERENCE TO RELATED APPLICATIONS

This application is the U.S. National Stage of PCT/FR2020/051055, filed Jun. 18, 2020, which in turn claims priority to French patent application number 1906647 filed Jun. 20, 2019. The content of these applications are incorporated herein by reference in their entirety.

TECHNICAL FIELD OF THE INVENTION

The invention pertains to the general field of turbomachines.

The invention more particularly relates to a method for coating a turbomachine guide vane making it possible to optimise the aerodynamic performances of said vane. The invention also pertains to a guide vane provided with a coating.

TECHNOLOGICAL BACKGROUND OF THE INVENTION

A bypass turbomachine comprises, at its upstream end, an air inlet supplying a fan that delivers an annular air flow splitting into two flows.

One part of the flow, called primary flow, is injected into a compressor that supplies a turbine driving the fan. The other part of the flow, called secondary flow, is injected to the atmosphere to provide a part of the thrust of the turbomachine, after having passed through a fixed blade ring arranged downstream of the fan.

The fixed blade ring, also known by the acronym OGV (outlet guide vane), makes it possible to guide the flow of air at the outlet of the fan into the secondary flow. The guide vanes, made of composite materials, are manufactured using a known so-called RTM (resin transfer moulding) method.

The RTM method consists in injecting a liquid resin into layers of dry reinforcement fibres preformed beforehand to the shape of the vane and arranged in a vacuum sealed mould. After the moulding step, it is known to deposit a metal reinforcement, in the form of a foil, on the leading edge of the vane in order to protect it from erosion and/or potential impacts (birds, gravel, ice, sand, etc.). Alternatively, the metal reinforcement is arranged on the preformed layers of reinforcement fibres during the resin injection step.

Further, a polymer coating provided with grooves is applied on the surfaces exposed to air flows. These grooves are oriented in the direction of travel of the air flow and make it possible to reduce the friction generated by the turbulent limit layers on the surface of the vanes exposed to the secondary flow.

If the presence of grooves makes it possible to reduce between 5 and 10% of the friction drag generated by the turbulent limit layers, they can also lead to an increase in friction when it involves laminar limit layers. In addition, the grooves can generate considerable aerodynamic losses if they involve unbonded limit layers or more generally non-oriented chaotic flows.

SUMMARY OF THE INVENTION

The invention offers a solution to the aforementioned problems, making it possible to limit the friction of the air flow on the surface of a guide vane.

A first aspect of the invention relates to a method for coating a turbomachine guide vane comprising a root and a tip, an extrados face and an intrados face connected to one another by a leading edge and a trailing edge.

The method for coating according to the first aspect comprises the following steps:

- completely covering one of the faces of the vane with a polymer coating provided with grooves,
- removing the grooves from a part of the polymer coating so that the polymer coating comprises a grooved zone of thickness e1 and a non-grooved zone of thickness e2,
- coating the non-grooved zone with a coat of paint of thickness e3 such that the thickness of the coat of paint superimposed on the non-grooved zone is substantially equal to the thickness e1 of the grooved zone.

Thanks to the method for coating according to the invention, the aerodynamic performances of the vane are improved.

Indeed, the method for coating according to the invention makes it possible to obtain a guide vane having a grooved zone on the surfaces exposed to turbulent flow and a substantially flat zone, i.e. the coat of paint, on the surfaces exposed to laminar flow. The presence of said zones on one of the surfaces of the vane make it possible to reduce the friction drag generated by the secondary flow during its passage on the exposed surfaces of the vane. In addition, the fact that the coat of paint is in the continuity of the grooved zone makes it possible to limit steps in surface transitions and thus to limit aerodynamic losses associated with the presence of such steps.

Further, the steps consisting in completely covering the face of the vane with a polymer coating provided with grooves and then removing the grooves on a determined zone of the polymer coating make it possible to simplify the integration of the polymer coating on the vane. In addition, the fact of keeping a part of the polymer coating, i.e. the non-grooved zone, on a zone where the grooves are not desired makes it possible to limit the amount of paint required to fill the thickness of polymer coating removed beforehand. Thus, this makes it possible to reduce the manufacturing costs and risks of non-compliance due to the presence of the coat of paint.

Apart from the characteristics that have been set out in the preceding paragraph, the method for coating according to the first aspect of the invention may have one or more complementary characteristics among the following, considered individually or according to all technically possible combinations thereof.

According to a non-limiting embodiment, the step of removal of the grooves is carried out by a sanding operation on a part of the polymer coating intended to form the non-grooved zone.

According to a non-limiting embodiment, the sanding operation is carried out at a pressure greater than 2.5 bars.

According to a non-limiting embodiment, prior to the removal step, the method for coating comprises a step of deposition of a protective film on a part of the polymer coating intended to form the grooved zone.

A second aspect of the invention relates to a turbomachine guide vane comprising a root and a tip, an extrados face and an intrados face connected to one another by a leading edge and a trailing edge.

The vane according to the second aspect being characterised in that:

- at least one of its faces is completely covered with a polymer coating comprising:
  - a grooved zone of thickness e1,

- a non-grooved zone of thickness e2 less than the thickness e1 of the grooved zone,
- a coat of paint, of thickness e3, covers the non-grooved zone such that the thickness of the coat of paint superimposed on the non-grooved zone is substantially equal to the thickness e1 of the grooved zone.

Apart from the characteristics that have been set out in the preceding paragraph, the guide vane according to the second aspect of the invention may have one or more complementary characteristics among the following, considered individually or according to all technically possible combinations thereof.

According to a non-limiting embodiment, the polymer coating is made of polyurethane.

According to a non-limiting embodiment, the coat of paint is made of polyurethane.

According to a non-limiting embodiment, the coat of paint extends onto the extrados face, along the root of the vane.

According to a non-limiting embodiment, the coat of paint extends onto the extrados face, along the leading edge.

The invention according to a third aspect relates to a turbomachine guide comprising at least one vane according to the second aspect of the invention.

The invention and the different applications thereof will be better understood on reading the description that follows and by examining the figures that accompany it.

BRIEF DESCRIPTION OF THE FIGURES

The figures are presented for indicative purposes and in no way limit the invention.

DETAILED DESCRIPTION

The figures are presented for indicative purposes and in no way limit the invention.

Unless stated otherwise, a same element appearing in the different figures has a single reference.

Figure 1:
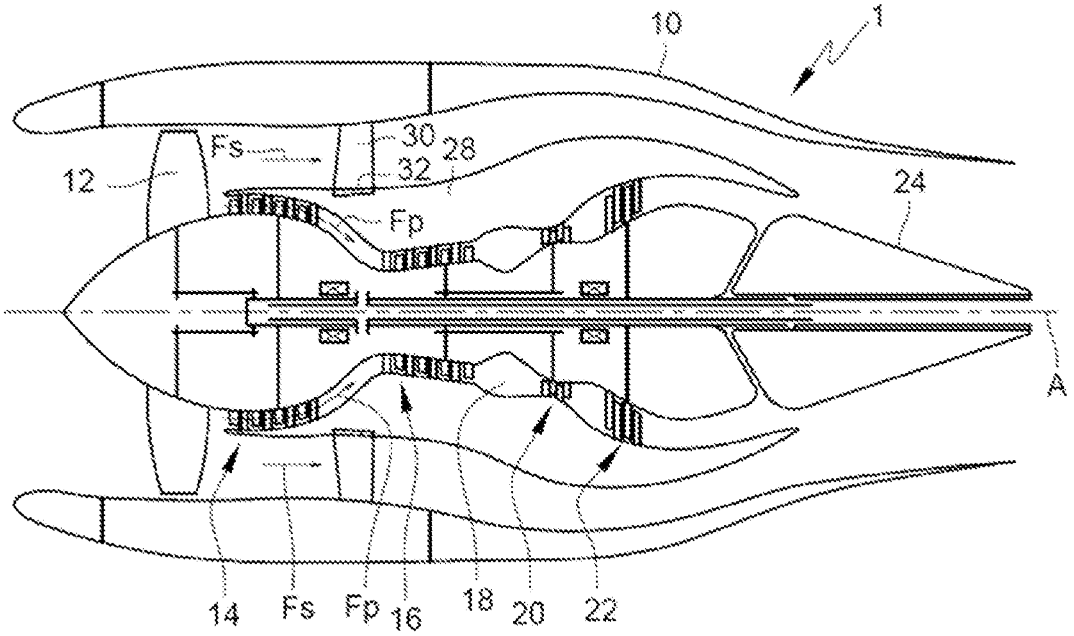
FIG. 1 illustrates a longitudinal sectional view of a bypass turbomachine.

FIG. 1 shows a schematic representation in longitudinal section of a bypass turbomachine 1.

In the remainder of the description, the terms "inner" and "outer", "axial and "radial", and derivatives thereof, are defined with respect to the longitudinal axis A of the turbomachine 1.

With reference to FIG. 1, a bypass turbomachine 1 has a longitudinal axis A and comprises an outer casing 10 inside of which are arranged, from upstream to downstream, a fan 12, a low pressure compressor 14, a high pressure compressor 16, a combustion chamber 18, a high pressure turbine 20, a low pressure turbine 22 and an exhaust cone 24. An inner casing 28 is arranged in the outer casing 10, around the compressors 14 and 16, of the combustion chamber 18 and the turbines 20 and 22. Further, a guide 30 extends downstream of the fan 12, between the inner 28 and outer 10 casings, in the region of the compressors 14 and 16.

In operation, the inner casing 28 divides the air flow accelerated by the fan 12 between a primary flow Fp which supplies the compressors 14 and 16, and a secondary flow Fs which flows between the inner 28 and outer 10 casings and is thus ejected from the turbomachine 1 after having crossed the guide 30 to supply a part of the thrust.

The guide 30, also designated by the acronym OGV for "outlet guide vane", makes it possible to guide the secondary flow Fs at the outlet of the fan 12 and comprises a plurality of fixed vanes 100 arranged in a crown around a ring 32 borne by the inner casing 28.

Figure 2:
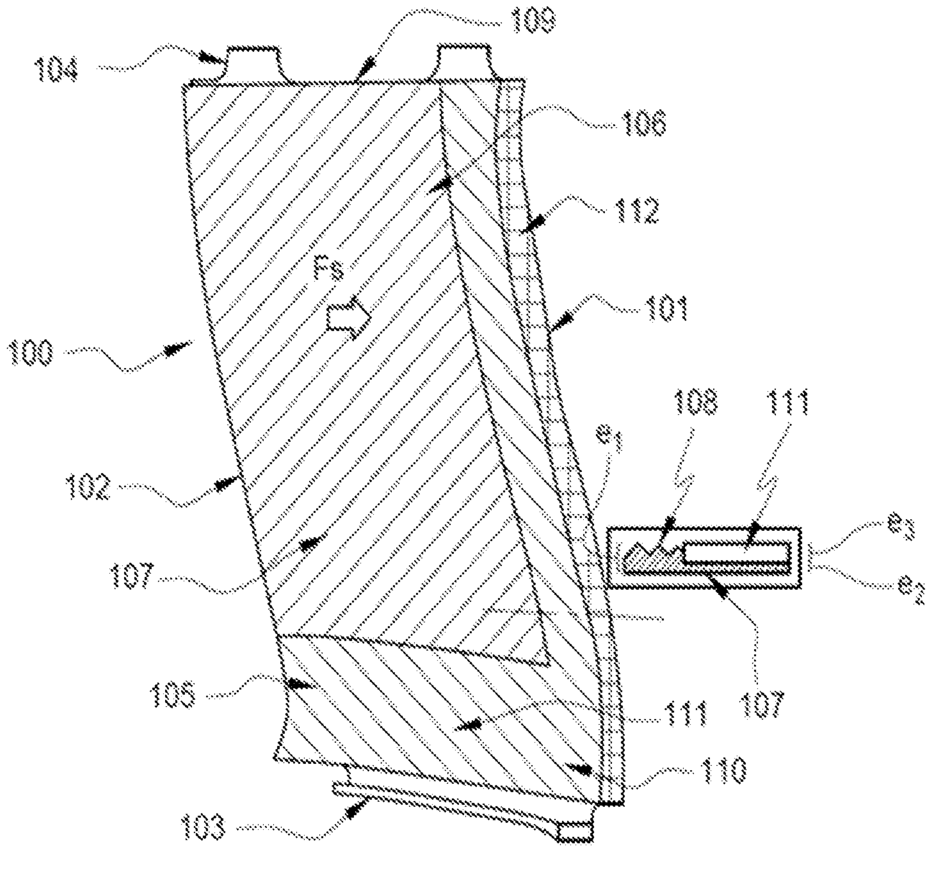
FIG. 2 illustrates a turbomachine guide vane according to a first embodiment of the invention.

FIG. 2 illustrates a guide 30 vane 100 according to a first embodiment of the invention.

With reference to FIG. 2, the vane 100 of the guide 30 has a leading edge 101, and a trailing edge 102, extending between a radially inner end 103, called root of the vane 100, and a radially outer end 104, called tip of the vane 100. The leading edge 101 and the trailing edge 102 delimit an extrados face 105 and an intrados face 106.

The vane 100 is for example manufactured using a moulding method called resin transfer moulding (RTM) during which a liquid resin, preferentially of epoxy type, is injected into layers of dry reinforcement fibres, notably made of carbon, preformed beforehand substantially in the shape of the vane 100 and arranged in a vacuum sealed mould.

Furthermore, in order to protect the leading edge 101 from erosion and/or potential impacts, it is covered with a metal reinforcement 112, for example made of nickel-cobalt alloy. The metal reinforcement 112 is preferably injected onto the preform made of layers of reinforcement fibres during the injection of the liquid resin. Advantageously, a film of adhesive is positioned between the metal reinforcement 112 and the preform in order to ensure the maintaining of the metal reinforcement 112 on the leading edge 101.

Further, the extrados face 105 is completely covered with a polymer coating 107, for example made of polyurethane. Advantageously, the polymer coating 107 is fixed to the extrados face by means of an adhesive applied on the leading edge 101.

A part 109 of the polymer coating 107, which will be called grooved zone, comprises a plurality of grooves 108 provided at the level of the part of the vane 100 intended to be exposed to turbulent flow. The grooved zone 109, of overall rectangular shape, is delimited by the tip 104 of the vane 100 and the trailing edge 102 so as to cover around 75% of the extrados face 105. The grooves 108, also called riblets, have a shape, for example a U or V shaped section, and dimensions suited to the flow conditions of said secondary flow Fs. Advantageously, the grooved zone 109 of the polymer coating 107 has a thickness e1 comprised between 200 and 300 μm.

The other part 110 of the polymer coating 107, which will be called non-grooved zone, is substantially flat and covers around 25% of the extrados face 105. In particular, the non-grooved zone 110 extends along the root 103 of the vane 100 and along the metal reinforcement 112 so as to form an L. In this configuration, the non-grooved zone 110 extends along the direction of travel of the secondary flow Fs, i.e. for the portion which extends along the root 103 of the vane 100, and along a direction perpendicular to the direction of travel of the secondary flow Fs, i.e. for the portion that extends along the metal reinforcement 112. Advantageously, the non-grooved zone 110 has a thickness e2 comprised between 100 and 200 μm.

In addition, the non-grooved zone 110 is covered with a coat of paint 111, for example made of polyurethane, intended to be exposed to laminar flow. The coat of paint 111 has a thickness e3 such that when the coat of paint 111 is applied on the non-grooved zone 110, the thickness of the coat of paint 111 superimposed on the non-grooved zone 110 of the polymer coating 107 is substantially equal to the thickness e1 of the grooved zone 109 of the polymer coating 107. Advantageously, the coat of paint 111 has a thickness e3 comprised between 80 and 120 μm.

Advantageously, the intrados face 106 is also covered with a polymer coating 107 and with a coat of paint 111 arranged on the surface of the vane 100 according to the flow conditions of the secondary flow Fs on the intrados face 106.

Figure 3A:
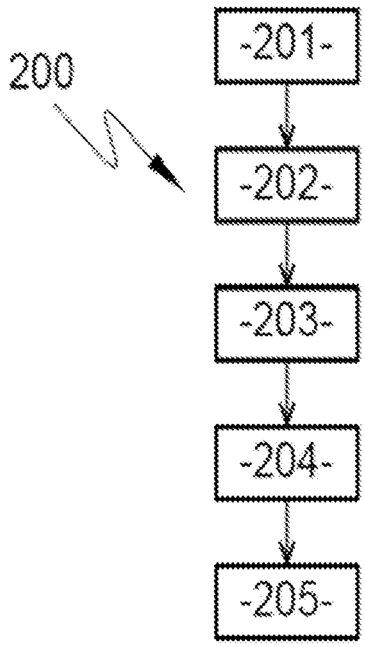
FIG. 3*a* is a block diagram illustrating the steps of the method for coating according to an embodiment of the invention.

FIG. 3*a* is a block diagram illustrating the steps of the method for coating 200 the guide 30 vane 100 according to an embodiment of the invention. It should be noted that the method for coating 200 according to the invention takes place after the manufacture of the vane 100 and the deposition of the metal reinforcement 112.

Figure 3B:
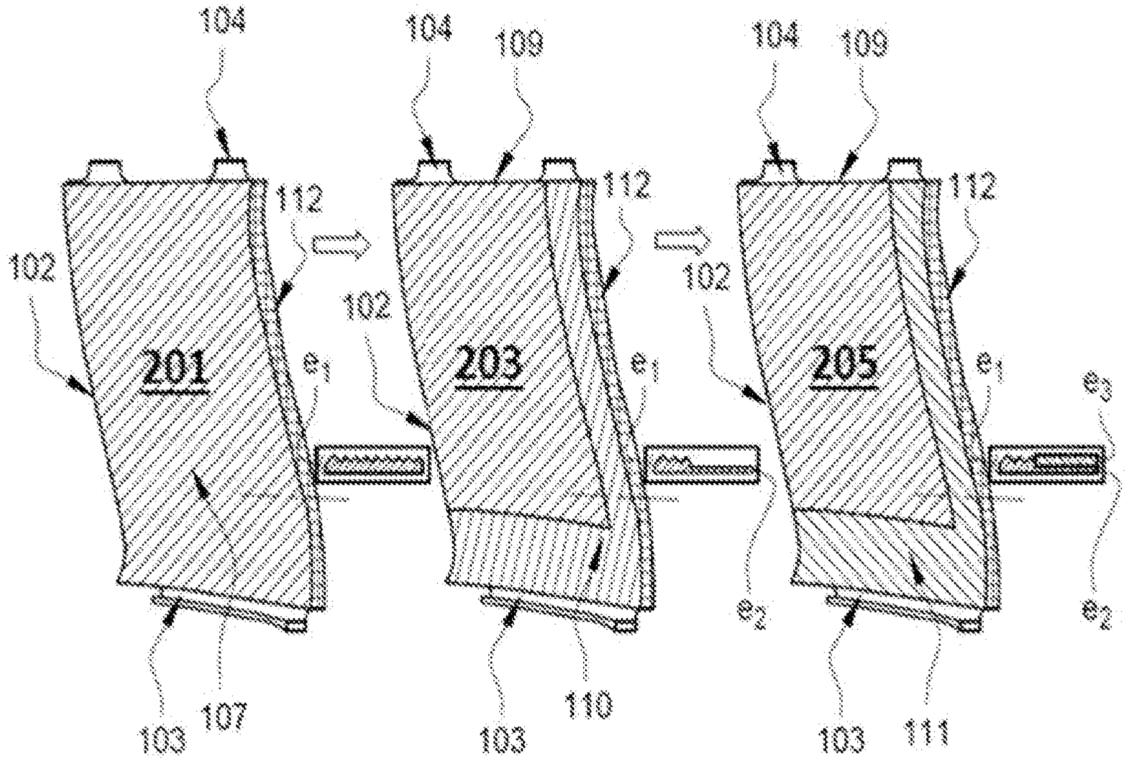
FIG. 3*b*, illustrates a part of the steps of the method for coating shown schematically in FIG. 3*a*.

FIG. 3*b* illustrates a part of the steps of the method for coating shown schematically in FIG. 3*a*.

In a first step 201, a polymer coating 107, of thickness e1, having grooves 108 is applied on the entire extrados face 105. Advantageously, a film of adhesive is used to maintain the polymer coating 107 on the extrados face 105 of the vane 100.

In a second step 202, a part 109 of the polymer coating 107 is covered with a protective film, for example made of polymer material.

In a third step 203, the grooves 108 present on the other part of the polymer coating 107, i.e. which is not covered by the protective film, are removed so as to obtain a non-grooved zone 110, of thickness e2, and a grooved zone 109. Advantageously, the removal of the grooves 108 is carried out by a sanding operation, preferably at a pressure greater than 2.5 bars.

In a fourth step 204, the protective film is removed from the part 109 of the polymer coating 107.

In a fifth step 205, the non-grooved zone 110 is coated with a coat of paint 111 of thickness e3 such that the thickness of the coat of paint 111 superimposed on the non-grooved zone 110 is substantially equal to the thickness e1 of the grooved zone 109. It should be noted that the coat of paint 111 of thickness e3 may be obtained by the application of one or more layers of paint on the non-grooved zone 110.

Figure 4:
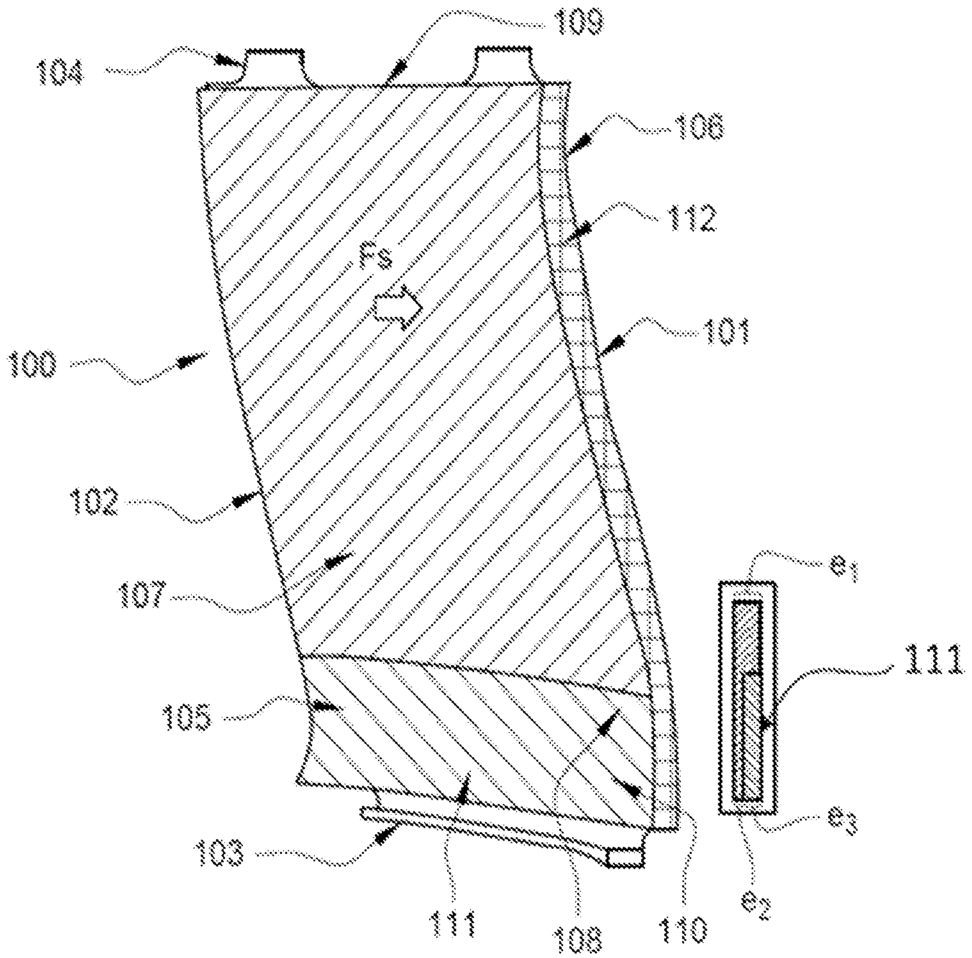
FIG. 4 illustrates a turbomachine guide vane according to a second embodiment of the invention.

FIG. 4 illustrates a guide 30 vane 100 according to a second embodiment of the invention.

The vane 100 according to the second embodiment is identical to the vane 100 according to the first embodiment, with the difference that the grooved 109 and non-grooved 110 zones are arranged in another manner on the extrados face 105 of the vane 100.

As may be seen in FIG. 4, the grooved zone 109 has an overall rectangular shape and is delimited by the tip 104 of the vane 100, the trailing edge 102 and the metal reinforcement 112 so as to cover around 75% of the extrados face 105. Advantageously, the grooved zone 109 of the polymer coating 107 has a thickness e1 comprised between 200 and 300 μm.

The non-grooved zone 110 of overall rectangular shape extends uniquely along the root 103 of the vane 100 so as to cover around 20% of the extrados face 105. In this configuration, the non-grooved zone 110 extends uniquely along the direction of travel of the secondary flow Fs. Advantageously, the non-grooved zone 110 has a thickness e2 comprised between 100 and 200 μm.

The non-grooved zone 110 is also covered with a coat of paint 111 of thickness e3 such that the coat of paint 111 superimposed on the non-grooved zone 110 has a thickness substantially equal to the thickness e1 of the grooved zone 109. Advantageously, the coat of paint 111 has a thickness e3 comprised between 80 and 120 μm.

The guide 30 vane 100 according to the second embodiment is produced using the method for coating 200 described previously.

The invention claimed is:

1. A method for coating a turbomachine guide vane comprising a root and a tip, an extrados face and an intrados face connected to one another by a leading edge and a trailing edge, the method comprising:

completely covering one of the extrados and intrados faces of the vane with a polymer coating of first thickness (e1) provided with grooves, removing the grooves from a part of the polymer coating in such a way that the polymer coating comprises a grooved zone and a non-grooved zone, and coating the non-grooved zone with a coat of paint of thickness (e3) such that the thickness of the coat of paint superimposed on the non-grooved zone is equal to the thickness (e1) of the grooved zone.

2. The method for coating according to claim 1, wherein the removing of the grooves is carried out by a sanding operation on a part of the polymer coating intended to form the non-grooved zone.

3. The method for coating according to claim 2, wherein the sanding operation is carried out at a pressure greater than 2.5 bars.

4. The method for coating according to claim 1, wherein, prior to the removing, the method for coating further comprises depositing a protective film on a part of the polymer coating intended to form the grooved zone.

5. A turbomachine guide vane comprising a root and a tip, an extrados face and an intrados face connected to one another by a leading edge and a trailing edge, wherein:

at least one of the extrados and intrados faces is completely covered with a continuous polymer coating comprising:

a grooved zone of thickness (e1), a non-grooved zone of thickness (e2) less than the thickness (e1) of the grooved zone, said continuous polymer coating forming said grooved zone and said non-grooved zone, a coat of paint, of thickness (e3), covers the non-grooved zone such that the thickness of the coat of paint superimposed on the non-grooved zone is equal to the thickness (e1) of the grooved zone.

6. The turbomachine guide vane according to claim 5, wherein the polymer coating is made of polyurethane.

7. The turbomachine guide vane according to claim 5, wherein the coat of paint is made of polyurethane.

8. The turbomachine guide vane according to claim 5, wherein the coat of paint extends onto the extrados face, along the root of the vane.

9. The turbomachine guide vane according to claim 8, wherein the coat of paint extends onto the extrados face, along the leading edge.

10. A turbomachine guide vane, comprising at least one vane according to claim 5.

11. The turbomachine guide vane according to claim 5, wherein the non-grooved zone is obtained by removing grooves formed in a part of the polymer coating that completely covers the at least one of the extrados and intrados faces in such a way that the polymer coating comprises said grooved zone and said non-grooved zone.

* * * * *